US012647412B2

(12) United States Patent
Sahni et al.

(10) Patent No.: US 12,647,412 B2
(45) Date of Patent: Jun. 2, 2026

(54) AUTHENTICATION TOKEN WITH PROOF OF POSSESSION FOR GP PROXY SUPPORT

(71) Applicant: Palo Alto Networks, Inc., Santa Clara, CA (US)

(72) Inventors: Mohit Sahni, Fremont, CA (US); Jacky Fang, New York, NY (US); Daphne Sang, Los Altos, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 331 days.

(21) Appl. No.: 18/427,514

(22) Filed: Jan. 30, 2024

(65) Prior Publication Data

US 2025/0247386 A1 Jul. 31, 2025

(51) Int. Cl.
*H04L 9/40* (2022.01)

(52) U.S. Cl.
CPC ................................ *H04L 63/0846* (2013.01)

(58) Field of Classification Search
CPC ............. H04L 63/0846; H04L 63/1466; H04L 63/0807; H04L 63/0815; H04L 67/146; H04L 67/563; H04L 63/0281; G06F 21/41
See application file for complete search history.

(56) References Cited

U.S. PATENT DOCUMENTS

| | | | | |
|---|---|---|---|---|
| 8,291,228 B2 * | 10/2012 | Laidlaw | ................... | H04L 63/08 713/176 |
| 12,166,905 B2 * | 12/2024 | Devarajan | ............. | H04L 9/3263 |

| | | | | |
|---|---|---|---|---|
| 2005/0132060 A1 * | 6/2005 | Mo | ........................ | H04L 51/212 709/227 |
| 2007/0136794 A1 * | 6/2007 | Chin | ........................ | H04L 63/08 726/5 |
| 2007/0174469 A1 * | 7/2007 | Andress | .............. | H04L 63/0884 709/227 |
| 2008/0141339 A1 * | 6/2008 | Gomez | ................... | H04L 63/20 726/1 |
| 2011/0107410 A1 * | 5/2011 | Dargis | .................... | H04L 63/08 726/11 |

(Continued)

FOREIGN PATENT DOCUMENTS

| | | | | | |
|---|---|---|---|---|---|
| EP | 2304639 B1 | * | 8/2020 | ........... | H04L 67/146 |
| WO | WO-2016141513 A1 | * | 9/2016 | ............... | H04L 9/40 |

OTHER PUBLICATIONS

J. Primbs and M. Menth, "OIDC²: Open Identity Certification With OpenID Connect," in IEEE Open Journal of the Communications Society, vol. 5, pp. 1880-1898, 2024, doi: 10.1109/OJCOMS.2024 (Year: 2024).*

*Primary Examiner* — Khalid M Almaghayreh
(74) *Attorney, Agent, or Firm* — Van Pelt, Yi & James LLP

(57) ABSTRACT

A method, system, and device for authenticating traffic for a web service. The method includes (i) generating a request for a first token for a user based at least in part on providing to a security portal to authenticate the user, (ii) obtaining a context structure comprising user information, a nonce, and a timestamp, (iii) intercepting a connection request on a local proxy listener, and (iv) generating an updated authentication token based at least in part on adding the first token and a proof of possession token to the connection request, wherein the proof of possession token is validated by a cloud service based at least in part on information comprised in the first token.

23 Claims, 10 Drawing Sheets

(56) References Cited

U.S. PATENT DOCUMENTS

| | | | |
|---|---|---|---|
| 2014/0037092 A1* | 2/2014 | Bhattacharya | H04L 9/3242 |
| | | | 380/255 |
| 2015/0026341 A1* | 1/2015 | Blacka | H04L 63/101 |
| | | | 709/225 |
| 2015/0200924 A1* | 7/2015 | Parla | H04L 63/04 |
| | | | 726/7 |
| 2017/0034142 A1* | 2/2017 | Camenisch | H04L 9/3268 |
| 2019/0228144 A1* | 7/2019 | Kermes | H04L 63/0861 |
| 2020/0099675 A1* | 3/2020 | Mardiks Rappaport | |
| | | | H04L 63/1466 |
| 2021/0279316 A1* | 9/2021 | Eisen | G06F 21/32 |
| 2021/0385085 A1* | 12/2021 | Wang | H04L 9/3213 |
| 2022/0343095 A1* | 10/2022 | Naqvi | G06V 10/774 |
| 2023/0344640 A1* | 10/2023 | Natanzon | H04L 63/123 |
| 2024/0205031 A1* | 6/2024 | Thongsom | G06F 16/182 |
| 2024/0275780 A1* | 8/2024 | Hebert | H04L 63/083 |
| 2025/0168808 A1* | 5/2025 | Ramachandran | H04W 24/10 |
| 2025/0184689 A1* | 6/2025 | Ramachandran | G01S 13/765 |

* cited by examiner

500

700

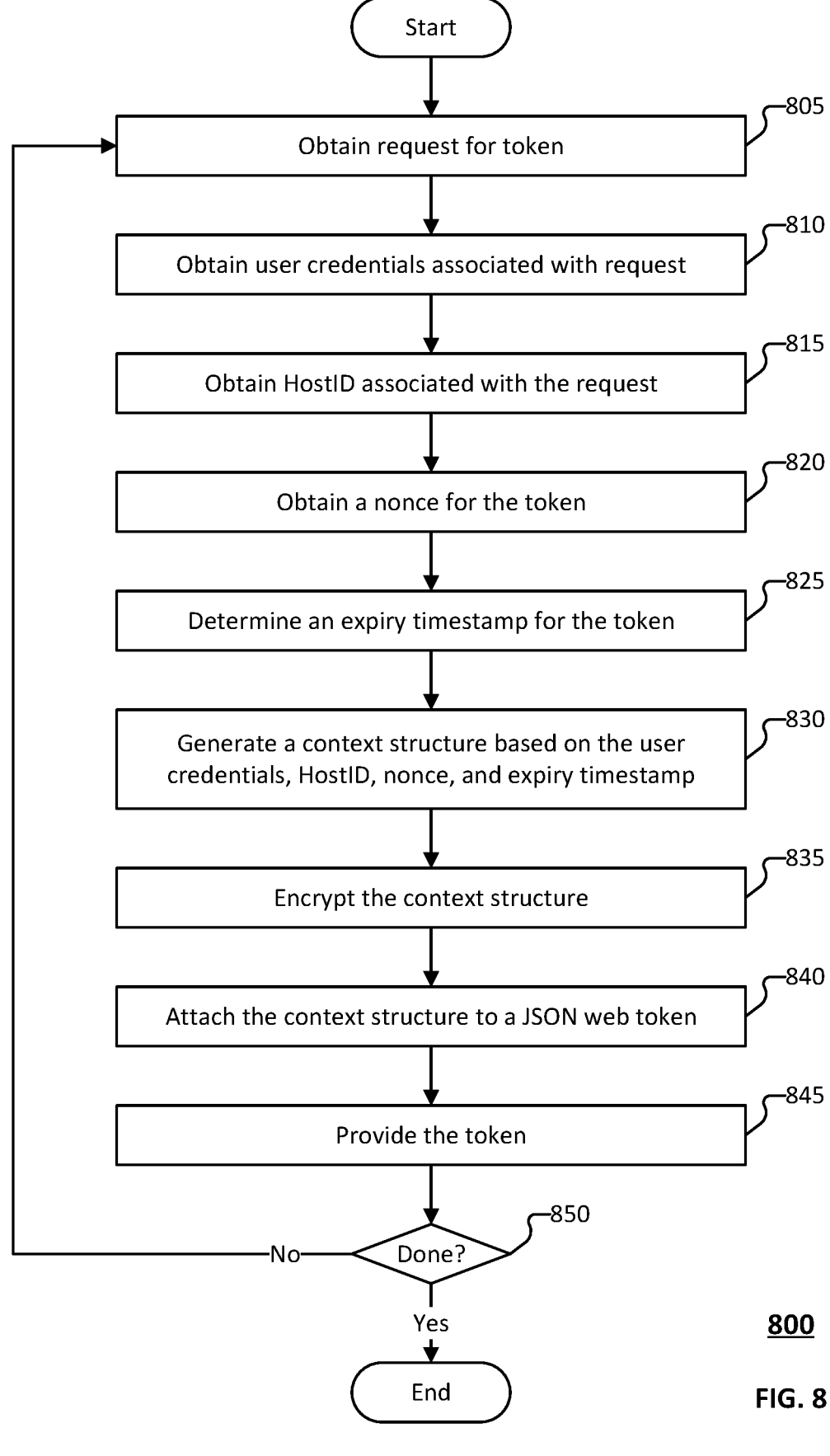

Start

Obtain request for token    ⌐805

Obtain user credentials associated with request    ⌐810

Obtain HostID associated with the request    ⌐815

Obtain a nonce for the token    ⌐820

Determine an expiry timestamp for the token    ⌐825

Generate a context structure based on the user credentials, HostID, nonce, and expiry timestamp    ⌐830

Encrypt the context structure    ⌐835

Attach the context structure to a JSON web token    ⌐840

Provide the token    ⌐845

Done?    ⌐850

No

Yes

End

AUTHENTICATION TOKEN WITH PROOF OF POSSESSION FOR GP PROXY SUPPORT

BACKGROUND OF THE INVENTION

As technology advances, electronic communication systems have become an integral part of our daily lives. However, the increased reliance on wireless communication has also exposed vulnerabilities, with replay attacks emerging as a significant threat to the confidentiality and integrity of sensitive information.

Replay attacks involve the interception and manipulation of communication between two parties, typically exploiting the distance limitations of secure communication protocols. Attackers can extend the range of communication by using an intermediary device, allowing them to impersonate legitimate users and gain unauthorized access to sensitive data or systems.

Existing security measures such as encryption and authentication protocols have proven effective to some extent but are susceptible to advanced replay attack techniques. Therefore, there is a need for an innovative solution that can reliably prevent replay attacks and ensure the secure transmission of data between communicating entities.

BRIEF DESCRIPTION OF THE DRAWINGS

Various embodiments of the invention are disclosed in the following detailed description and the accompanying drawings.

FIG. 8 is a flow diagram of a method for providing a token according to various embodiments.

DETAILED DESCRIPTION

Figure 1:
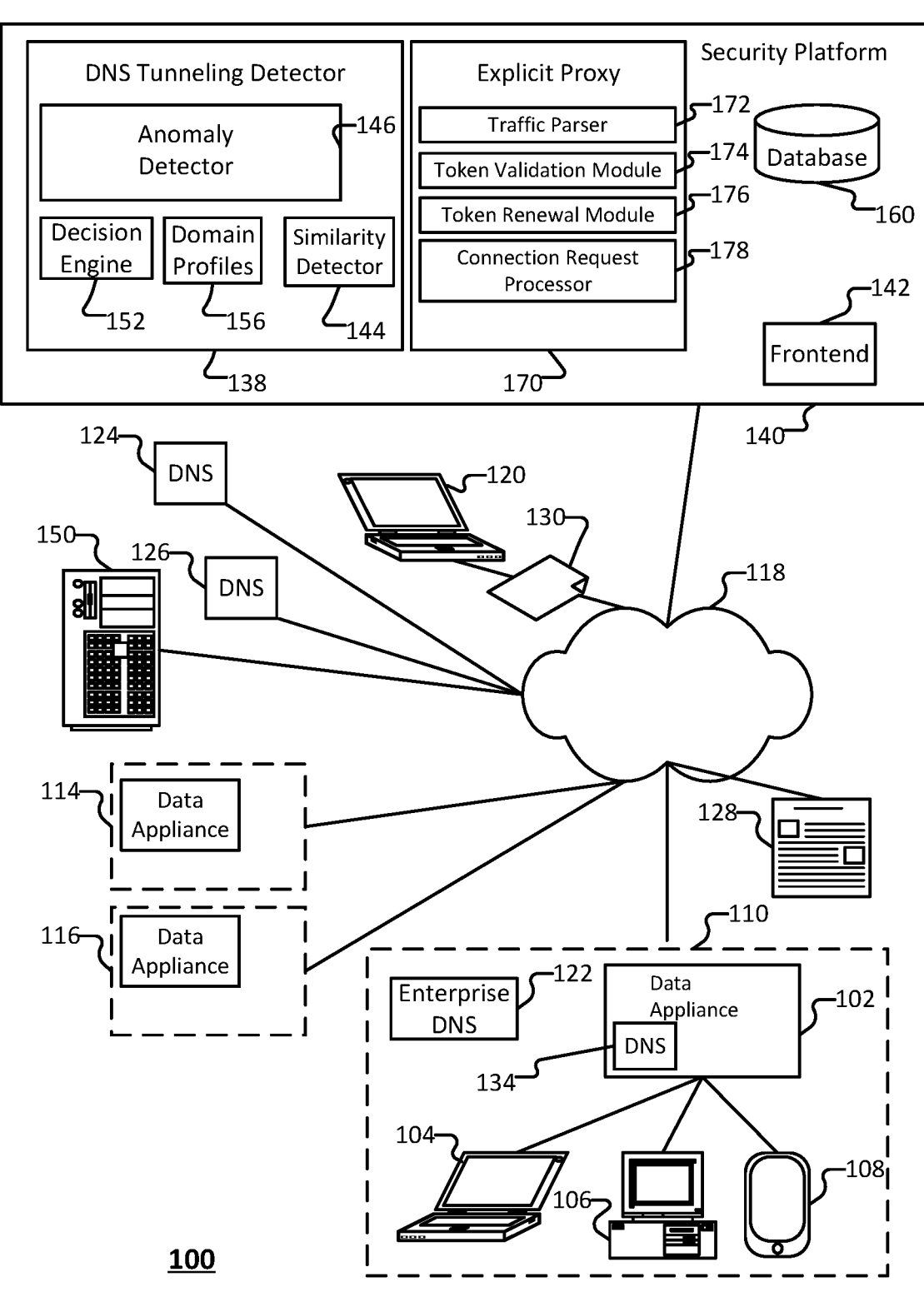
FIG. 1 is a block diagram of an environment for detecting malicious authentication requests according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a JSON web token (JWT) includes data with optional signature and/or optional encryption whose payload holds JSON that asserts some number of claims. The tokens are signed either using a private secret or a public/private key. For example, a server could generate a token that has the claim "logged in as administrator" and provide that to a client. The client could then use that token to prove that it is logged in as admin. The tokens can be signed by one party's private key (usually the server's) so that any party can subsequently verify whether the token is legitimate.

In some embodiments, the JWT is used as an authentication token, which may also be referred to herein as a first token.

In some embodiments, a token (e.g., the JWT) is configured to have a structure according to which the token comprises a header, a payload, and a signature. The header may provide an indication of an algorithm used to generate the signature, such as an indication that the SHA-256 algorithm is used. The signature validates the token. As an example, the signature can be calculated by encoding the header and payload using a predefined algorithm (e.g., a Base64 encoding, a Base64url encoding, etc.). The header, payload, and the signature may be separately encoded (e.g., using a Base64url encoding, etc.) and concatenated to generate the token.

In authentication, when the user successfully logs in using their credentials, a JWT will be returned and must be saved locally (typically in local or session storage, but cookies can also be used), instead of the traditional approach of creating a session in the server and returning a cookie. For unattended processes, the client may also authenticate directly by generating and signing its own JWT with a pre-shared secret and pass it to an OAuth compliant service.

Various embodiments provide a system and method for secure communication that mitigates the risks associated with replay attacks. In some embodiments, the system implements the use of unique tokens generated dynamically and associated with each communication session. At least one token (e.g., the proof of possession token) serves as ephemeral keys, significantly enhancing the security of the communication channel. Various embodiments ensure secure communication include:

Dynamic Token Generation: The system implements the dynamic generation of tokens, ensuring uniqueness for each communication session. This prevents attackers from predicting or replicating the tokens for unauthorized access.

Token Synchronization: Tokens are synchronized between communicating entities in a secure manner, ensuring that only the intended parties possess the necessary information to decrypt and validate the communication.

Time-Sensitive Authentication: The tokens are time-sensitive, rendering them ineffective for replay attacks if intercepted. The short lifespan of each token adds an additional layer of security to the communication process.

Multi-factor Authentication: The tokens may be used to complement existing authentication methods, providing a multi-factor authentication approach that significantly raises the bar for attackers attempting replay attacks.

Advantages of the system according to various embodiments include enhanced security, compatibility, and scalability, as further described below.

Enhanced Security: The use of dynamic tokens adds an extra layer of security, making it significantly more challenging for attackers to compromise communication channels.

Compatibility: The use of the techniques described herein (e.g., the use of a proof of possession token and an authentication token inserted into a connection request) can be integrated seamlessly into existing communication protocols, ensuring broad applicability across various electronic communication systems.

Scalability: The system is scalable to accommodate a wide range of applications, from financial transactions to secure access control systems.

Various embodiments thus provide a robust solution to the challenges posed by replay attacks in electronic communication systems. The dynamic and time-sensitive nature of the tokens, combined with their secure synchronization, establishes a highly effective defense against unauthorized access and ensures the integrity of sensitive information during communication.

Various embodiments provide method, system, and device for authenticating traffic for a web service. The method includes (i) generating a request for a first token for a user based at least in part on providing to a security portal user credentials to authenticate the user, (ii) obtaining a context structure comprising user information, a nonce, and a timestamp, (iii) intercepting a connection request on a local proxy listener, and (iv) generating an updated authentication token based at least in part on adding the first token and a proof of possession token to the connection request, wherein the proof of possession token is validated by a cloud service based at least in part on information comprised in the first token. The context structure may be an encrypted context structure that is encrypted using a shared key or a public/private key pair(s). The information comprised in the encrypted context structure may be obtained based at least in part on performing a decryption with respect to the encrypted context structure.

FIG. 1 is a block diagram of an environment for detecting malicious authentication requests according to various embodiments. In some embodiments, system 100 is implemented by at least part of system 200 of FIG. 2, system 300 of FIG. 3, and/or system 400 of FIG. 4.

In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy, a network traffic handling policy, etc.) regarding communications between client devices, such as client devices 104 and 106, and nodes outside of enterprise network 110 (e.g., reachable via external network 118). Examples of such policies include policies governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. Other examples of policies include security policies (or other traffic monitoring policies) that selectively block traffic, such as traffic to malicious domains or parked domains, or traffic for certain applications (e.g., SaaS applications), or malicious or invalid authentication requests. In some embodiments, data appliance 102 is also configured to enforce policies with respect to traffic that stays within (or from coming into) enterprise network 110.

In some embodiments, data appliance 102 is configured to comprise agent 305 of system 300 or agent 405 of system 400. For example, data appliance is configured to implement system 200 of FIG. 2. In other embodiments, agent 305 or agent 405 is implemented by security platform, which receives connection requests from data appliance 102, and explicit proxy 170 is implemented by another device, such as a server. For example, agent 305 may correspond to an agent service running on the server, etc.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with remote security platform 140. Security platform 140 can provide a variety of services, including (a) managing/maintaining a security policy configuration(s) for enterprise network 110 and/or devices connected to enterprise network 110 (e.g., managed devices, security entities, etc.), (b) enforcing the security policy configuration or causing a security entity (e.g., a firewall) to enforce the security policy configuration, (c) classifying network traffic, (d) classifying authentication requests and/or connection requests, (c) determining a manner by which authentication requests and/connection requests are to be handled (e.g., based at least in part on a predicted authentication classification, etc.), (f) training a machine learning (ML) model to generate predictions with respect to network traffic classifications, (g) generating or validating a proof of possession token, (h) obtaining (e.g., from a security portal) an authentication token, (i) authenticating a user, (j) generating an updated connection request, (k) serving as a proxy for a web service, (l) processing an updated connection request, and/or (m) performing an active measure with respect to network traffic (e.g., authentication requests) or files communicated across the network based on an instruction from another service or system or based on security platform 140 using a classifier (e.g., an ML model, a rule-based model, etc.) to generate a prediction with respect to the network traffic (e.g., a prediction of whether the network traffic, or session data for a particular traffic protocol, is malicious).

Security platform 140 may implement other services, such as determining an attribution of network traffic to a particular DNS tunneling campaign or tool, indexing features or other DNS-activity information with respect to particular campaigns or tools (or as unknown), classifying network traffic (e.g., identifying application(s) to which particular samples of network traffic corresponding, determining whether traffic is malicious, detecting malicious traffic, detecting C2 traffic, etc.), providing a mapping of signatures to certain traffic (e.g., a type of C2 traffic) or a mapping of signatures to applications/application identifiers (e.g., network traffic signatures to application identifiers), providing a mapping of IP addresses to certain traffic (e.g., traffic to/from a client device for which C2 traffic has been detected, or for which security platform 140 identifies as being benign), performing static and dynamic analysis on malware samples, assessing maliciousness of domains, determining whether domains are parked domains, providing a list of signatures of known exploits (e.g., malicious input strings, malicious files, malicious domains, etc.) to data appliances, such as data appliance 102 as part of a subscription, detecting exploits such as malicious input strings, malicious files, or malicious domains (e.g., an on-demand detection, or periodical-based updates to a mapping of domains to indications of whether the domains are malicious or benign), providing a likelihood that a domain is malicious (e.g., a parked domain) or benign (e.g., an unparked domain), determining and/or providing an indication or a likelihood that authentication request is malicious, determining and/or providing an indication or a likelihood that network traffic for a particular traffic protocol (e.g., HTTP session data) is malicious, determining a model score, providing/updating a whitelist of input strings, files, domains, source addresses, destination address, authentication requests, or other characteristics or attributes of network traffic deemed to be benign, providing/updating input strings, files, domains, source addresses, destination address, authentication requests, or other characteristics or attributes of network traffic deemed to be malicious, identifying malicious input strings, detecting malicious input strings, detecting malicious files, predicting whether input strings, files, or domains are malicious, and providing an indication that an input string, file, or domain is malicious (or benign).

In some embodiments, explicit proxy 170 can serve as a proxy for a web service. Explicit proxy 170 processes updated connection requests in connection with providing a service to a requesting user/device. As an example, explicit proxy 170 is configured to process the connection requests (e.g., the updated connection requests) in a manner that restricts replay attacks.

In some embodiments, the system is configured to use a proof of possession token and an authentication token in conjunction to enable the explicit proxy to validate the connection request and determine whether the connection request is valid (e.g., is not associated with a replay attack). The explicit proxy performs validation with respect to both the proof of possession token and the authentication token. If the explicit proxy determines that both the proof of possession token and the authentication token is valid, the explicit proxy deems the connection request to be valid and correspondingly processes the connection request (e.g., to provide service via the applicable web service). If the explicit proxy determines that one or more of the proof of possession token and the authentication token is invalid, then the explicit proxy deems the connection request to be invalid and determines not to process the connection request to provide the requested service. Rather, the explicit proxy may provide an indication that connection request is invalid and/or delete or quarantine the connection request. If the explicit proxy determines that the proof of possession token is invalid, the system may deem the connection request as part of a replay attack.

Although the example shows that security platform 140 comprises explicit proxy 170, in various other embodiments, the explicit proxy 170 may be implemented by another server(s)/service and security platform 140 may comprise an agent, such as an agent that receives connection requests from users/devices (e.g., from firewalls or other security entities mediating traffic across a network) and configures the connection requests to comprise the proof of possession token and the authentication token.

Security platform 140 may be further configured to classify network traffic, such as to determine whether the traffic is malicious or benign, or to determine a likelihood that the traffic is malicious or benign. Security platform 140 can store one or more classifiers (e.g., rule-based models, machine learning models, etc.). For example, Security platform 140 implements a classifier for predicting whether authentication requests or connection requests (e.g., received from a proxy or client device) are malicious/benign. Security platform 140 can further store/implement one or more security policies, such as a traffic-handling policy, according to which security platform 140 causes the network traffic (e.g., the authentication requests) to be handled.

In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140 but may also be provided by a third party. As one example, the virtual machine server can rely on EC2, with the remainder portions of security platform 140 provided by dedicated hardware owned by and under the control of the operator of security platform 140.

In some embodiments, explicit proxy 170 is implemented as a proxy to an authentication service such as to mediate traffic to the authentication service and prevent the authentication service from being overwhelmed by a denial of service campaign.

In some embodiments, explicit proxy 170 maintains/manages one or more security policy configurations, such as firewall rules or traffic handling policies. In the example shown, explicit proxy comprises traffic parser 172, token validation module 174, token renewal module 176, and/or connection request processor 178. Explicit proxy 170 can receive network data, such as authentication requests or connection requests to authenticate a user or device for a web service. In some embodiments, explicit proxy 170 receives the network data in connection with processing a request from a client system or other security entity (e.g., a firewall) for a network traffic classification or for processing the request. In response to receiving the connection request, explicit proxy 170 parses the connection request (e.g., the updated connection request), obtain a proof of possession token such as from the header of the connection request, obtains an authentication token such as from the header of the connection request, performs a validation with respect to proof of possession token and the authentication token, and handles the connection request accordingly.

Explicit proxy 170 can use traffic parser 172 to parse a network traffic, such as a connection request for a web service. Traffic parser 172 can analyze the connection request to obtain various attributes associated with the connection request, such as the proof of possession token and/or authentication token. Traffic parser 172 can obtain the proof of possession token and/or authentication token from a header of the connection request (e.g., an updated connection request comprising the tokens inserted by an agent). Other information that traffic parser 172 can obtain from the connection request may include an indication of a user (e.g., the username), account, and/or device (e.g., a host identifier) with which the connection request is associated.

Explicit proxy 170 can use token validation module 174 to validate a connection request. Token validation module 174 can validate the connection request based at least in part on validating the proof of possession token and the authentication token. If token validation module 174 determines that both the proof of possession token and the authentication token is valid, token validation module 174 deems the connection request to be valid.

In some embodiments, token validation module 174 validates the proof of possession token based at least in part on generating a version of the proof of possession token and comparing the version of the proof of possession token with the proof of possession token obtained from the connection request. The version of the proof of possession token may be generated based at least in part on information extracted from the authentication token which was obtained from the connection request. In response to determining the version proof of possession token and the proof of possession token obtained from the connection request are the same, token validation module 174 deems the proof of possession token obtained from the connection request to be valid. Otherwise, token validation module 174 deems the proof of possession token to be invalid. As an example, token validation module 174 can invoke process 1000 of FIG. 10 to validate the proof of possession token.

In some embodiments, token validation module 174 validate the authentication token based at least in part on determining whether the authentication token obtained from the connection request has expired. For example, token validation module 174 determines whether the authentication token is still valid based at least in part on an expiry timestamp extracted from the authentication token. As an example, token validation module 174 determines whether a current time is after the authentication token's expiry time based at least in part on the expiry timestamp.

Explicit proxy 170 can use token renewal module 176 to provide an indication that a new authentication token is to be obtained. In response to token validation module 174 determining that the authentication token is invalid, token renewal module 176 sends to the agent from which the connection request was received an indication that a new authentication token is to be obtained or that the authentication token inserted in the connection request sent by the agent had expired. Additionally, or alternatively, token renewal module 176 may provide an indication that a new authentication token is to be obtained in response to determining that a current time is within a predefined threshold of time from the time at which the authentication token is set to expire.

Explicit proxy 170 can use connection request processor 178 to handle a connection request according to whether explicit proxy 170 (e.g., token validation module 174) determines whether connection request is valid, such as based on determining whether both a proof of possession token and an authentication token comprised in the connection request are valid. In response to determining that the connection request is not valid, explicit proxy 170 can quarantine, delete, or otherwise determine not to process the connection request. Additionally, in response to determining that the connection request is not valid, explicit proxy 170 can provide an indication that the connection request is invalid. The indication that the connection request is invalid can be provided to the agent from which the connection request is received and/or the device associated with the user for the connection request. In response to determining that the connection is valid, connection request processor 178 causes the connection request to be processed, such as for the web service to provide the service being requested.

Returning to FIG. 1, suppose that a malicious individual (using client device 120) has created malware or malicious sample 130, such as a file, an input string, etc. The malicious individual hopes that a client device, such as client device 104, will execute a copy of malware or other exploit (e.g., malware or malicious sample 130), compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as C2 server 150, as well as to receive instructions from C2 server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C2 server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C2 server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C2 server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier that implements a pre-filter model, such as in connection with detecting malicious or suspicious samples, detecting parked domains, or otherwise determining that certain detected network traffic is to be further analyzed (e.g., using a finer detection model).

In various embodiments, when a client device (e.g., client device 104) attempts to resolve an SQL statement or SQL command, or other command injection string, data appliance 102 uses the corresponding sample (e.g., an input string) as a query to security platform 140. This query can be performed concurrently with the resolution of the SQL statement, SQL command, or other command injection string. As one example, data appliance 102 can send a query (e.g., in the JSON format) to a frontend 142 of security platform 140 via a REST API. Using processing described in more detail below, security platform 140 will determine whether the queried SQL statement, SQL command, or other command injection string indicates an exploit attempt and provide a result back to data appliance 102 (e.g., "malicious exploit" or "benign traffic").

In various embodiments, when a client device (e.g., client device 104) attempts to open a file or input string that was received, such as via an attachment to an email, instant message, or otherwise exchanged via a network, or when a client device receives such a file or input string, DNS module 134 uses the file or input string (or a computed hash or signature, or other unique identifier, etc.) as a query to security platform 140. In other implementations, an inline security entity queries a mapping of hashes/signatures to traffic classifications (e.g., indications that the traffic is C2 traffic, indications that the traffic is malicious traffic, indications that the traffic is benign/non-malicious, etc.). This query can be performed contemporaneously with receipt of the file or input string, or in response to a request from a user to scan the file. As one example, data appliance 102 can send a query (e.g., in the JSON format) to a frontend 142 of security platform 140 via a REST API. Using processing described in more detail below, security platform 140 will determine (e.g., using a malicious file detector that may use a machine learning model to detect/predict whether the file is malicious) whether the queried file is a malicious file (or likely to be a malicious file) and provide a result back to data appliance 102 (e.g., "malicious file" or "benign file").

Figure 2:
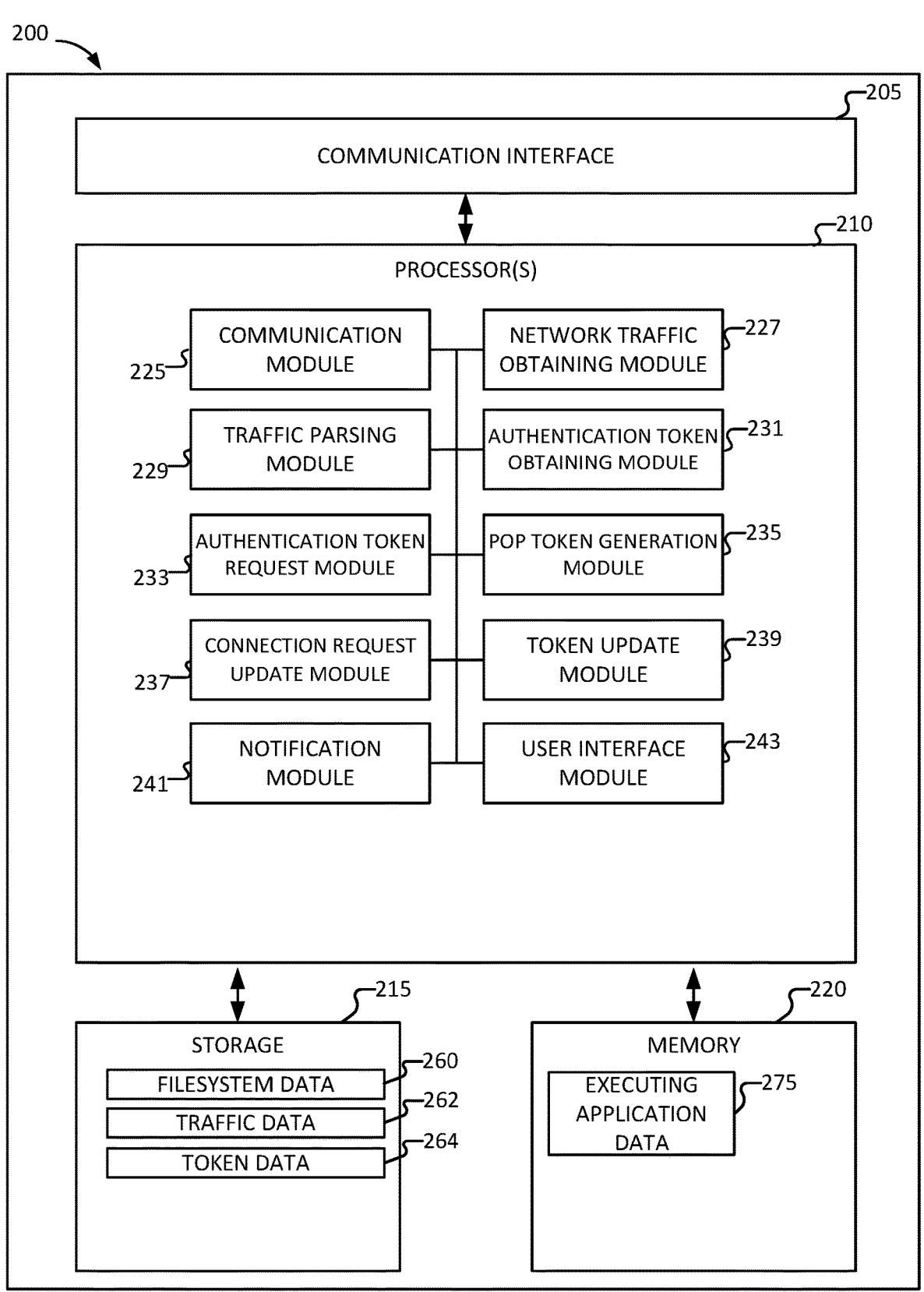
FIG. 2 is a block diagram of a system to classify authentication requests according to various embodiments.

FIG. 2 is a block diagram of a system to classify authentication requests according to various embodiments. In some embodiments, system 200 is implemented by at least part of system 100 of FIG. 1, system 300 of FIG. 3, and/or system 400 of FIG. 4. In some embodiments, system 200 can implement one or more of processes 500-1000 of FIGS. 5-10. System 200 may be implemented in one or more servers, a security entity such as a firewall, an endpoint, a security service provided as a software as a service.

In some embodiments, system 200 is an entity that mediates traffic to an authentication service and/or a web service (e.g., an explicit proxy for the web service). For example, system 200 intercepts connection requests for a web service and determines updated connection requests that are configured to enable the explicit proxy to restrict/mitigate replay attacks. In some embodiments, system 200 configures the updated connection requests to comprise (i) the authentication token for authenticating the user associated with the request (or for indicating that the user has already been authenticated) and (ii) a proof of possession token. The proof of possession token may be a token that has a short validity period (e.g., 60 seconds, 120 seconds, etc.) and is generated based at least in part on a random number (e.g., a 32-bit nonce).

In some embodiments, the explicit proxy to which system 200 sends the updated connection request extracts the proof of possession token and the authentication token and validates both tokens. The explicit proxy may deem the updated connection request to be valid (e.g., not malicious or not part of a replay attack) if both the proof of possession token and the authentication token are valid. Conversely, if one or more of the proof of possession token and the authentication token are invalid, the explicit proxy deems the updated connection request as invalid and does not further process the updated connection request.

In the example shown, system 200 implements one or more modules in connection with enforcing a security policy configuration (e.g., a policy of), classifying network samples, such as multi-modal exploits, etc. System 200 comprises communication interface 205, one or more processor(s) 210, storage 215, and/or memory 220. One or more processors 210 comprises one or more of communication module 225, network traffic obtaining module 227, traffic parsing module 229, authentication token obtaining module 231, authentication token request module 233, proof of possession (POP) token generation module 235, connection request update module 237, token update module 239, notification module 241, and user interface module 243.

In some embodiments, system 200 comprises communication module 225. System 200 uses communication module 225 to communicate with various nodes or end points (e.g., client terminals, firewalls, DNS resolvers, data appliances, other security entities, etc.) or user systems such as an administrator system. For example, communication module 225 provides to communication interface 205 information that is to be communicated (e.g., to another node, security entity, etc.). As another example, communication interface 205 provides to communication module 225 information received by system 200. Communication module 225 is configured to receive an indication of samples (e.g., network traffic samples, such as connection requests, authentication requests, HTTP requests, URLs, URIs, SSL communications, etc.) to be analyzed and/or processed, such as from network endpoints or nodes such as security entities (e.g., firewalls), database systems, query systems, proxies for web services, etc. Communication module 225 is configured to obtain connection requests, such as from client devices or other endpoints, and to send connection requests (e.g., updated connection requests) to explicit proxies or other web services. For example, system 200 uses communication module 225 to query the third-party service(s). Communication module 225 is further configured to receive one or more settings or configurations from an administrator.

In some embodiments, system 200 comprises network traffic obtaining module 227. System 200 uses network traffic obtaining module 227 to receive network traffic samples. In some embodiments, such as in contexts where system 200 is an inline security entity that provides security across the network, network traffic obtaining module 227 intercepts requests (e.g., connection requests or other requests for a service) to a web service or an explicit proxy for a web service. Network traffic obtaining module 227 may be configured to intercept connection requests on its local proxy listener.

In some embodiments, system 200 comprises traffic parsing module 229. System 200 uses traffic parsing module 229 to parse connection requests obtained (e.g., intercepted) by network traffic obtaining module 227. Traffic parsing module 229 obtains a set of attributes associated with the connection request. Examples of attributes that can be extracted based on the connection request include user credentials, device information, etc. The user credentials may comprise a user identifier (e.g., the user name), a password or other authentication information, etc. The device information may comprise the host identifier (e.g., the HostID).

In some embodiments, system 200 comprises authentication token obtaining module 231. System 200 uses authentication token obtaining module 231 to obtain the authentication token for the user or device associated with the connection request. In response to the connection request being intercepted, uses authentication token obtaining module 231 determines whether system 200 locally stores, or has access to, a valid authentication token (e.g., a token that has not expired) for the user or device associated with the connection request.

In some embodiments, the authentication token is a JSON web token (JWT). The JWT may comprise a context structure that comprises a user identifier (e.g., the user identifier), the device information (e.g., the HostID), a nonce (e.g., a crypto-secure random number), and an expiry timestamp.

In response to determining that system 200 locally stores, or has access to, a valid authentication token, authentication token obtaining module 231 can obtain the token (e.g., from local storage) or a token location, and provide the token or token location to connection request update module 237 for updating the connection request before it is sent to an explicit proxy for the intended web service. Additionally, authentication token obtaining module 231 may provide the valid authentication token to POP token generation module 235 in connection with the generation of the proof of possession token.

In response to determining that system 200 does not store or have access to a valid authentication token, authentication token obtaining module 231 can invoke authentication token request module 233 to query a security protocol for an authentication token to be generated.

In some embodiments, system 200 comprises authentication token request module 233. System 200 uses authentication token request module 233 to request that an authentication token be generated. For example, authentication token request module 233 queries a security protocol for an authentication token for the user or device associated with the intercepted connection request being processed. In connection with requesting the authentication token, authentication token request module 233 can send user credentials and/or device information to the security protocol for authentication/validation and generation of the authentication token. In response to receiving the generated authentication token, authentication token request module 233 can provide the authentication token to authentication token obtaining module 231 for the generation of the proof of possession token and/or an updated connection request.

In some embodiments, system 200 comprises POP token generation module 235. System 200 uses POP token generation module 235 to generate the proof of possession token such as in connection with system 200 generating an updated connection request to be sent to an explicit proxy for a web service. POP token generation module 235 may generate the proof of possession token based at least in part on the authentication token (e.g., the JWT). For example, an encrypted context structure is obtained from the JWT. POP token generation module 235 decrypts the encrypted context structure and parses the context structure to obtain at least a nonce (e.g., a random number such as a 32-bit crypt-secure random number). In response to obtaining the nonce, POP token generation module 235 obtains a timestamp, rounds off the timestamp to the previous minute (e.g., the previous whole minute, such as by rounding an example timestamp of 1:49 to 1:00), concatenates the rounded-off timestamp and the nonce according to a predefined concatenation process, and encrypts the concatenated result. The concatenated result may be encrypted according to a predefined encryption technique. For example, POP token generation module 235 computes a cryptographic hash (e.g., a SHA 256 hash) for the concatenated result. The encrypted concatenated result corresponds to the proof of possession token.

In some embodiments, system 200 comprises connection request update module 237. System 200 uses connection request update module 237 to update the intercepted connection request to comprise the proof of possession token and the authentication token (e.g., the authentication token for the user or device associated with the connection request). Connection request update module 237 can generate the updated connection request based at least in part on inserting the proof of possession token and the authentication token to a header for the connection request (e.g., the HTTP header, etc.). In response to generating the updated connection request, connection request update module 237 provides the updated connection request to communication module 225 for sending the updated connection request to the explicit proxy for the intended web service.

In some embodiments, system 200 comprises token update module 239. System 200 uses token update module 239 to determine whether to request a new authentication token. Token update module 239 may determine to request a new authentication token for a particular user or device in response to determining that the authentication token has expired (e.g., based on the embedded expiry timestamp).

Additionally, or alternatively, token update module 239 determines to request a new authentication request in response to receiving an indication from an explicit proxy that the authentication request has expired or is within a predefined time period of expiration (e.g., will expire shortly).

In some embodiments, system 200 comprises notification module 241. System 200 uses notification module 241 to provide an indication that the explicit proxy has refused to process the connection request, such as because one or more of the proof of possession token and authentication token has expired.

In some embodiments, system 200 comprises user interface module 243. System 200 uses user interface module 243 to configure and provide a user interface to a user, such as to a client system used by an administrator. User interface module 243 configures a user interface to provide the notifications or alerts, such as prompting the user that a malicious connection request (e.g., a request for a web service) is detected or has been handled, prompting the user to select an active measure to be performed with respect to particular traffic, etc.

According to various embodiments, storage 215 comprises one or more of filesystem data 260, traffic data 262, and token data 264. Storage 215 comprises a shared storage (e.g., a network storage system) and/or database data, and/or user activity data.

In some embodiments, filesystem data 260 comprises a database such as one or more datasets (e.g., datasets comprising samples of connection requests, mappings of indications for connections requests or predicted authentication request classifications for network traffic to the authentication requests or hashes, signatures or other unique identifiers of the authentication requests, etc.). Filesystem data 260 comprises data such as historical information pertaining to HTTP request data or network traffic, a whitelist of network traffic profiles (e.g., hashes or signatures for the HTTP request data) or IP addresses deemed to be safe (e.g., not suspicious, benign, etc.), a blacklist of network traffic (e.g., authentication request) profiles deemed to be suspicious or malicious, etc.

In some embodiments, traffic data 262 comprises connection requests that system 200 intercepts, such as connection requests intended for a particular web service (e.g., an explicit proxy for such web service). Additionally, traffic data 262 comprises an updated connection request, such as a connection request to which system 200 inserts a proof of possession token and authentication token in the header before sending the connection request to the applicable explicit proxy.

In some embodiments, token data 264 comprises a set of authentication tokens and a set of proof of possession tokens. Token data 264 may comprise a mapping of authentication tokens to users (e.g., to user identifiers). System 200 may query the mapping of authentication tokens to determine whether system 200 stores an authentication token for the user associated with an intercepted connection request, and to obtain the authentication token in response to determining that token data 264 comprises the applicable authentication token. Additionally, or alternatively, token data 264 may comprise a mapping of users (or user identifiers) and/or authentication tokens to proof of possession tokens.

In some embodiments, traffic handling policy data 266 comprises one or more policies to be enforced by a security entity. For example, traffic handling policy data 266 comprises a policy that defines how authentication requests are to be handled based on corresponding authentication request classifications.

According to various embodiments, memory 220 comprises executing application data 275. Executing application data 275 comprises data obtained or used in connection with executing an application such as an application executing a hashing function, an application to extract information from connection requests, authentication requests, webpage content, an input string, an application to extract information from a file, or other sample, etc. In embodiments, the application comprises one or more applications that perform one or more of receive and/or execute a query or task, generate a report and/or configure information that is responsive to an executed query or task, and/or provide to a user information that is responsive to a query or task. Other applications comprise any other appropriate applications (e.g., an index maintenance application, a communications application, a machine learning model application, an application for detecting suspicious authentication requests, an application for detecting malicious network traffic or malicious/non-compliant applications such as with respect to a corporate security policy, a document preparation application, a report preparation application, a user interface application, a data analysis application, an anomaly detection application, a user authentication application, a security policy management/update application, etc.).

Figure 3:
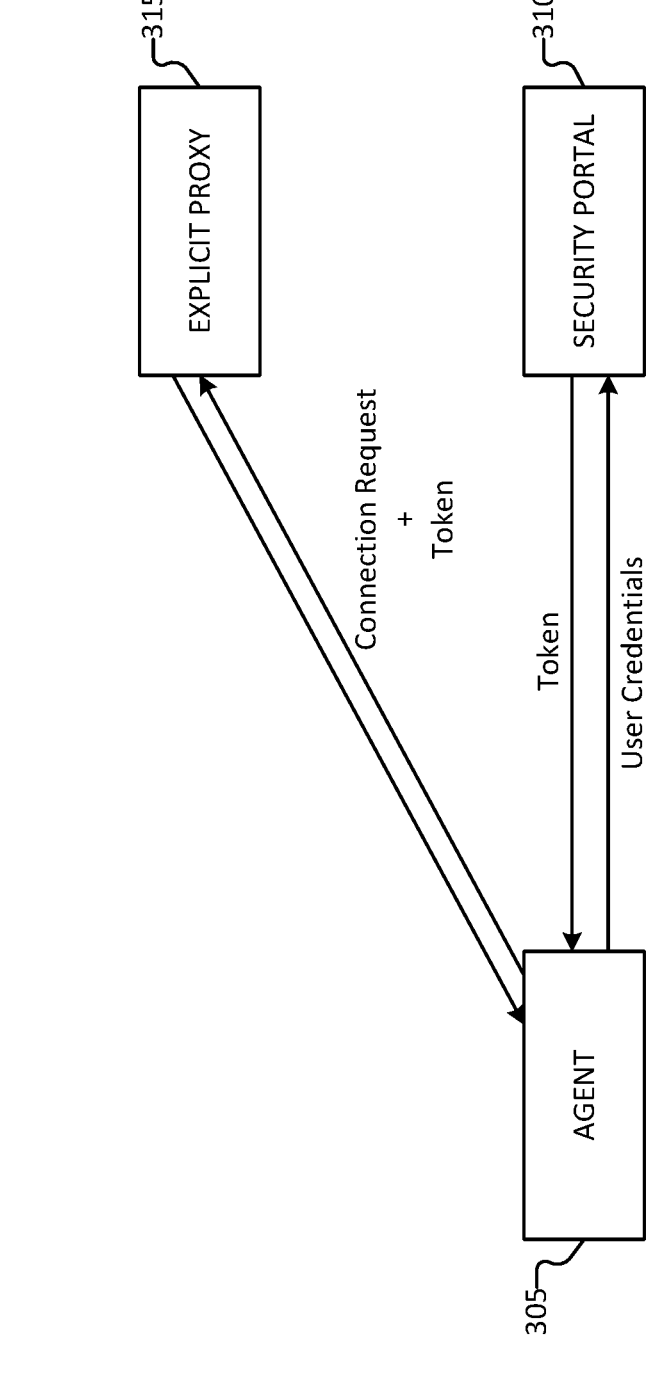
FIG. 3 is an illustration of a system for validating a connection request according to various embodiments.

FIG. 3 is an illustration of a system for validating a connection request according to various embodiments. In some embodiments, system 300 can implement one or more of processes 500-1000 of FIGS. 5-10. In the example shown, system 300 comprises agent 305, security portal 310, and explicit proxy 315. Agent 305 is configured to intercept network traffic (e.g., connection requests) to explicit proxy 315 or a web service associated with explicit proxy 315. For Security portal 310 is configured to authenticate users (e.g., a user associated with a connection request) and generates a token to be shared with explicit proxy 315 to enable explicit proxy 315 to determine whether the user or device associated with the connection request is allowed to access the corresponding web service (e.g., that the user has been authenticated and has appropriate permissions). Explicit proxy 315 is configured to receive connection requests for a web service(s) and to process the connection request to provide the web service(s) for valid connection requests (e.g., for users having the requisite permissions).

In response to intercepting a connection request intended for explicit proxy 315, agent 305 determines whether it stores a valid authentication token for the user/device associated with the connection request. If agent 305 does not store a valid authentication token, agent 305 sends the user credentials to security portal 310, such as in connection with a request for an authentication token. Security portal 310 can validate the user, such as based on the user credentials provided by agent 305 and generate an authentication token. For example, security portal 310 invokes process 800 of FIG. 8. In response to obtaining the authentication token, security portal 310 provides the authentication token to agent 305.

Agent 305 uses the authentication token to generate a proof of possession token. For example, agent 305 decrypts the authentication token, extracts certain information (e.g., the nonce comprised in the context structure), and generates the proof of possession token according to a predefined process. Agent 305 may invoke process 700 of FIG. 7 to generate the proof of possession token. Agent updates the connection request based on the proof of possession token and the authentication token, such as by inserting the proof of possession token and the authentication token to a header for the connection request (e.g., the HTTP header). Agent 305 then sends the updated connection request to explicit proxy 315.

In response to receiving the updated connection request, explicit proxy 315 parses the updated connection request to obtain the proof of possession token and the authentication token. Explicit proxy 315 validates both the proof of possession token and the authentication token and processes the connection request (e.g., provides the requested service) in response to determining that both the proof of possession token and the authentication token are valid. Conversely, explicit proxy 315 determines not to process the connection request (e.g., to quarantine or delete the request) in response to determining that either the proof of possession token or the authentication token is invalid. In some embodiments, explicit proxy 315 validates the proof of possession token based on invoking process 1000 of FIG. 10 or other similar validation process.

Figure 4:
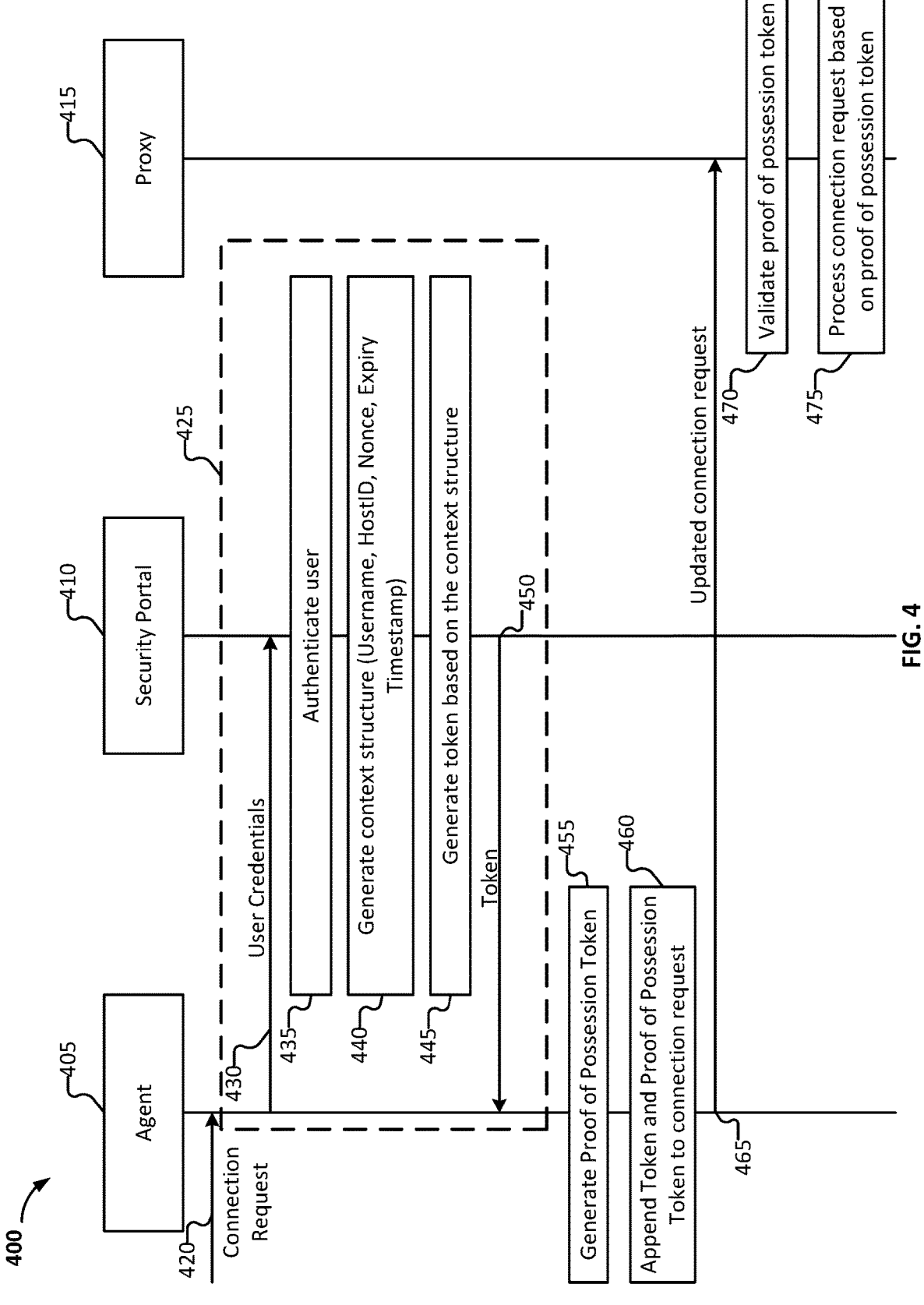
FIG. 4 is an illustration of a system for handling an authentication request according to various embodiments.

FIG. 4 is an illustration of a system for handling an authentication request according to various embodiments. In some embodiments, system 400 can implement one or more of processes 500-1000 of FIGS. 5-10. In the example shown, system 400 comprises agent 405, security portal 410, and proxy 415. Agent 405 is configured to intercept network traffic (e.g., connection requests) to proxy 415 or a web service associated with proxy 415. For example, agent 405 intercepts an HTTP connection request on its local proxy listener. Security portal 410 is configured to authenticate users (e.g., a user associated with a connection request) and generate a token to be shared with proxy 415 to enable proxy 415 to determine whether the user or device associated with the connection request is allowed to access the corresponding web service (e.g., that the user has been authenticated and has appropriate permissions). Proxy 415 is configured to receive connection requests for a web service(s) and to process the connection request to provide the web service(s) for valid connection requests (e.g., for users having the requisite permissions).

At 420, agent 405 receives a connection request. For example, agent 405 uses its local proxy listener to intercept traffic intended for proxy 415. In response to obtaining the connection request, agent 405 may determine whether it stores (or has access to) a valid token, such as a JWT, associated with the user. If agent 405 determines that it does not store the valid token, system 400 (e.g., agent 405) can invoke process 425 to obtain a token. Conversely, if agent 405 determines that it stores the valid token, system 400 can skip process 425 and proceed to 455.

System 400 (e.g., security portal 410) generates the token (e.g., an authentication token such as a JWT) in response to receiving user credentials and/or device information associated with the connection request. For example, at 430 of process 425, agent 405 sends the user credentials and/or device information to security portal 410. Agent 405 may send the user credentials and/or device information in association with a request for a token (e.g., the authentication token). At 435 of process 425, security portal 410 authenticates the user, such as by validating the user credentials and/or device information. In response to authenticating the user, process 420 proceeds to 440 at which security portal 410 generates a context structure. In connection with generating the context structure, security portal 410 obtains a user identifier (e.g., the username), device information (e.g., the HostID), a nonce, and expiry timestamp. The nonce may be a random number, such as a crypto-secure random number. The expiry timestamp may be indicative of a time at which the token (e.g., the authentication token), such as a predefined period time from a current time or the predefined period of time from a timestamp associated with the connection request. Security portal 410 may generate a context structure by inserting the username, HostID, nonce, and expiry timestamp into a context structure template, or by concatenating the username, HostID, nonce, and expiry timestamp according to a predefined concatenation process. In response to generating the context structure, at 445 of process 425, security portal 410 generates the token based at least in part on the context structure. For example, security portal 410 generates the token based at least in part on encrypting the context structure according to a predefined encryption technique. Examples of the encryption technique include a base64 encryption, a base64url encryption, etc. At 450 of process 425, security portal 410 provides the generated token to agent 405.

Although the example described in relation to FIG. 4 describes the obtaining/generating the token in response to the connection request, in some embodiments, agent 405 obtains the token in response to (e.g., contemporaneous with) the user being authenticated, which can be before the first connection request is received.

At 455, agent 405 obtains (e.g., generates) a proof of possession token based at least in part on the token (e.g., the authentication token) received from security portal 410. Agent 405 may generate the proof of possession token based at least in part on information extracted from the token, such as by decrypting the token. In some embodiments, agent 405 generates the proof of possession token by invoking process 700 of FIG. 7 or other similar proof of possession token technique.

At 460, agent 405 updates the connection request based at least in part on the proof of possession token and the token (also referred to herein as the first token) received from the security portal 410 (e.g., the authentication token). In some embodiments, agent 405 inserts the proof of possession token and the token received from the security portal 410 to a header for the connection request (e.g., the HTTP header).

At 465, agent 405 provides the updated connection request (e.g., a request having a header comprising the proof of possession token and the authentication token) to proxy 415.

In response to receiving the updated connection request, proxy 415 extracts the proof of possession token and the authentication token from the updated connection request. Proxy 415 can determine whether to process/service the connection request based on the proof of possession token and/or the authentication token. For example, at 470, proxy 415 validates the proof of possession token. Proxy 415 may validate the proof of possession token by generating its own copy of the proof of possession token (e.g., a hash) using information comprised in the authentication token (e.g., the nonce) and a current timestamp, and comparing the locally generated proof of possession token and the proof of possession token comprised in the updated connection request. Proxy 415 obtains the information comprised in the authentication token by decrypting the authentication token and parsing the decrypted token (e.g., to obtain the nonce). In some embodiments, proxy 415 validates the proof of possession token based at least in part on invoking process 1000 of FIG. 10, or other similar process. At 475, proxy 415 processes the updated connection request based at least in part on the proof of possession token. For example, in response to determining that the proof of possession token is valid, and the authentication token is valid (e.g., has not expired), proxy 415 processes the connection request to provide the user with the requested service. As another example, if the proxy 415 determines that either the proof of possession token or the authentication token is invalid, proxy 415 can determine not to process the connection request and/or provide an indication to the user that the connection request is invalid or denied.

Figure 5:
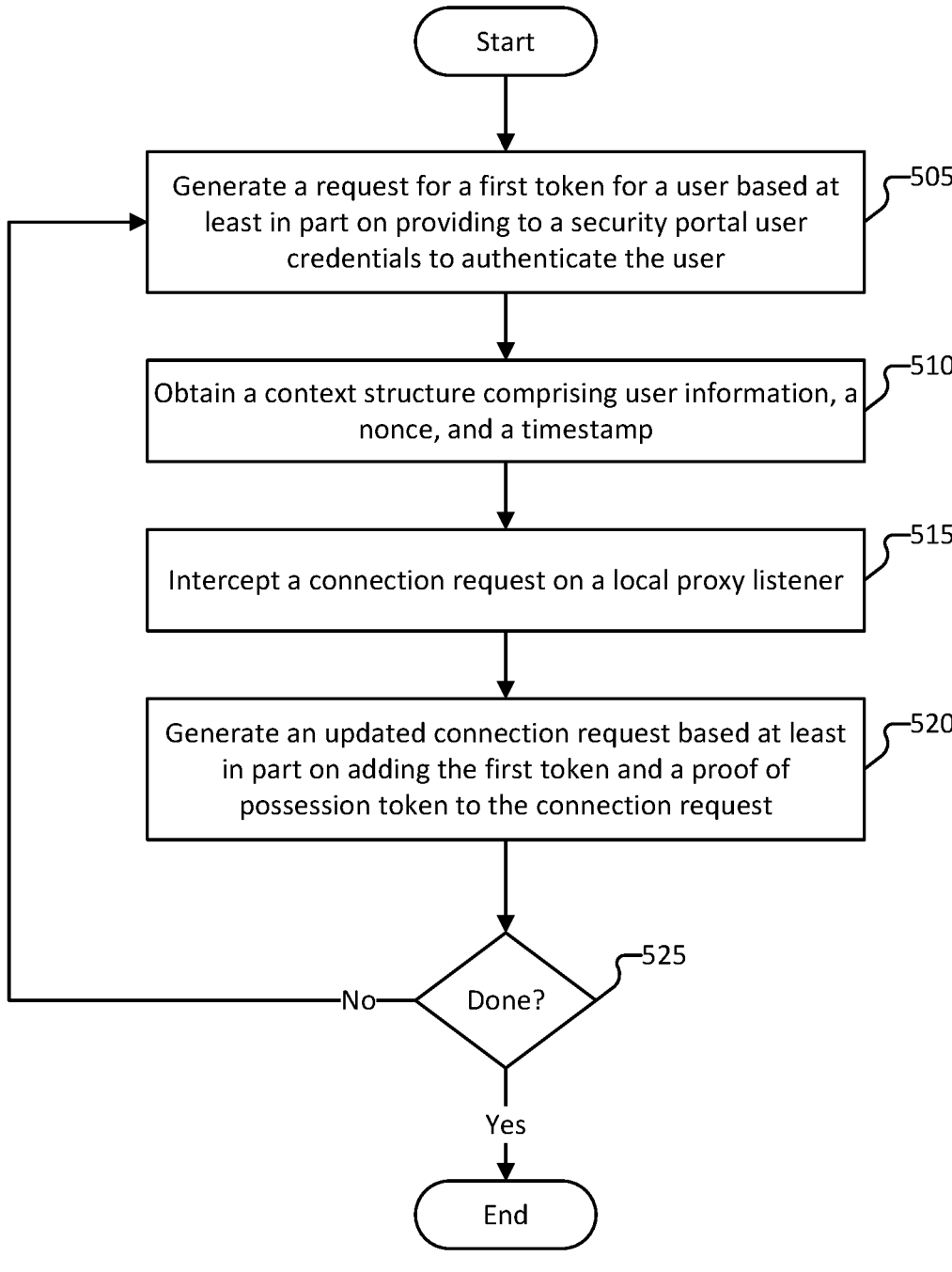
FIG. 5 is a flow diagram of a method for processing a connection request according to various embodiments.

FIG. 5 is a flow diagram of a method for processing a connection request according to various embodiments. In various embodiments, process 500 is implemented at least in part by system 100 of FIG. 1 and/or system 200 of FIG. 2. Process 500 may be implemented by an agent (e.g., a client agent that interfaces with the security profile) to generate a proof of possession token.

In some implementations, process 500 may be implemented by one or more servers, such as in connection with providing a service to a network (e.g., a security entity and/or a network endpoint such as a client device). In some implementations, process 500 may be implemented by a security entity (e.g., a firewall) such as in connection with enforcing a security policy with respect to files communicated across a network or in/out of the network.

Process 500 may be implemented in connection with processing an intercepted connection request for transmission to an explicit proxy for the corresponding web service. For example, the token can be communicated to a proxy for a service in connection with a connection request, which can use the token to validate the connection request to a service, such as to prevent/mitigate replay attacks.

At 505, the system generates a request for a first token for a user based at least in part on providing to a security portal user credentials to authenticate the user. The first token may be a JWT, or another type of token generated according to a predefined tokenization process.

At 510, the system obtains a context structure comprising user information, a nonce, and a timestamp. In some embodiments, the user information comprises a user identifier (e.g., a username), a host identifier (e.g., the HostID), etc.

At 515, the system intercepts a connection request on a local proxy listener. For example, the system (e.g., the agent) is configured to monitor and intercept traffic intended for a particular explicit proxy or web service. Although FIG. 5 shows 515 being performed after 510, the connection request may be intercepted before performing 505 (e.g., the first token is requested in response to the system intercepting the connection request.

At 520, the system generates an updated connection request based at least in part on adding the first token and a proof of possession token to the connection request. In some embodiments, the system adds the first token and the proof of possession token to a header for the connection request.

In response to generating the updated connection request, the system may send the updated connection request to the explicit proxy or web service to which the intercepted connection request was intended.

At 525, a determination is made as to whether process 500 is complete. In some embodiments, process 500 is determined to be complete in response to a determination that no further connection requests are to be processed, no further connection requests are intercepted, an administrator indicates that process 500 is to be paused or stopped, etc. In response to a determination that process 500 is complete, process 500 ends. In response to a determination that process 500 is not complete, process 500 returns to 505.

Figure 6:
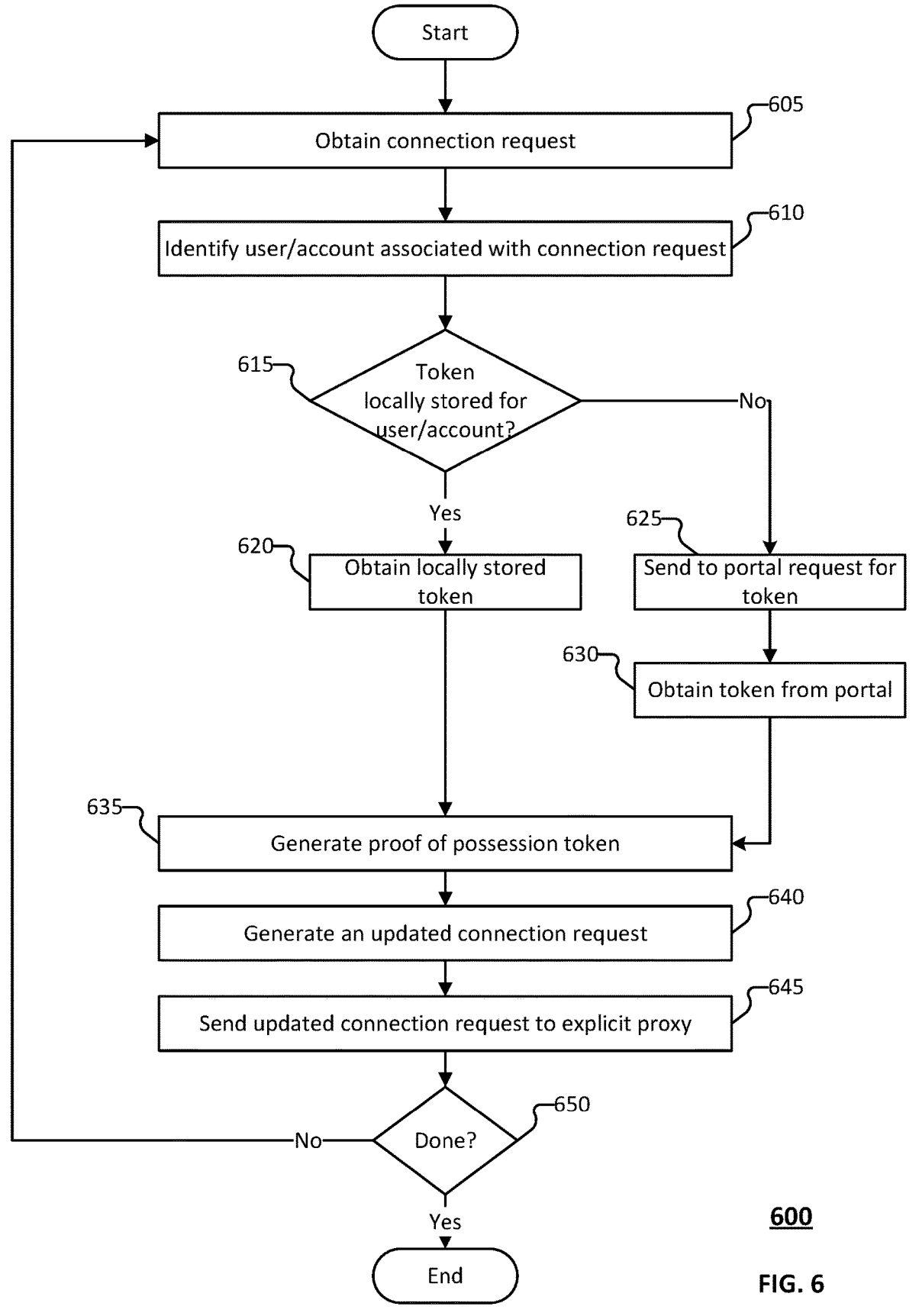
FIG. 6 is a flow diagram of a method for updating a connection request to include a token according to various embodiments.

FIG. 6 is a flow diagram of a method for updating a connection request to include a token according to various embodiments. In various embodiments, process 600 is implemented at least in part by system 100 of FIG. 1 and/or system 200 of FIG. 2. Process 700 may be implemented by an agent (e.g., a client agent that interfaces with the security profile) to generate a proof of possession token.

In some implementations, process 600 may be implemented by one or more servers, such as in connection with providing a service to a network (e.g., a security entity and/or a network endpoint such as a client device). In some implementations, process 600 may be implemented by a security entity (e.g., a firewall) such as in connection with enforcing a security policy with respect to files communicated across a network or in/out of the network.

Process 600 may be implemented in connection with processing an intercepted connection request for transmission to an explicit proxy for the corresponding web service. For example, the token can be communicated to a proxy for a service in connection with a connection request, which can use the token to validate the connection request to a service, such as to prevent/mitigate replay attacks.

At 605, the system obtains a connection request. In some embodiments, the system intercepts a connection request intended for an explicit proxy for a web service.

At 610, the system identifiers the user or account associated with the connection request. In some embodiments, the system obtains from the connection request a set of one or more user credentials. As an example, the system obtains the username (or other user identifier) and the host identifier (e.g., the HostID) from the connection request.

At 615, the system determines whether a token for the user or account is locally stored. For example, the system determines whether it stores, or has access to, a valid token for the user or account. In some embodiments, the token is a JWT.

If the system determines that it comprises, or has access to, a token for the user or account, the system determines whether the token is still valid, such as by determining whether the token has expired. The system may determine whether the token has expired based on an expiry timestamp comprised in the token. The expiry timestamp can be (i) a time at which the token expires, or (ii) a time from which expiration is to be measured (e.g., a time at which the token was generated) such as by determining whether a predefined time period has lapsed since the time.

In response to determining that the token for the user or account is locally stored, process 600 proceeds to 620 at which the system obtains the locally stored token.

Conversely, in response to determining that the token for the user or account is not locally stored, process 600 proceeds to 625 at which the system sends to the portal (e.g., a security portal) a request for the token. The request for the new token may comprise the username or other identifier, the HostID, etc. The token may be generated by the portal which may invoke process 800 of FIG. 8.

At 635, the system generates a proof of possession token. In some embodiments, the proof of possession token is generated based at least in part on a current timestamp and a nonce extracted from the token (e.g., the locally stored valid token, or the new token received from the portal). The system may implement a predefined algorithm or process to obtain the proof of possession token. As an example, the system may invoke process 700 to generate the proof of possession token.

At 640, the system generates an updated connection request. In some embodiments, the system generates the updated connection request based at least in part on the proof of possession token and the token (e.g., the JWT). For example, the system inserts the proof of possession token and the JWT into a header for the connection request.

At 645, the system sends the updated connection request to the explicit proxy.

At 650, a determination is made as to whether process 600 is complete. In some embodiments, process 600 is determined to be complete in response to a determination that no further connection requests are to be processed, no further connection requests are intercepted, an administrator indicates that process 600 is to be paused or stopped, etc. In response to a determination that process 600 is complete, process 600 ends. In response to a determination that process 600 is not complete, process 600 returns to 605.

Figure 7:
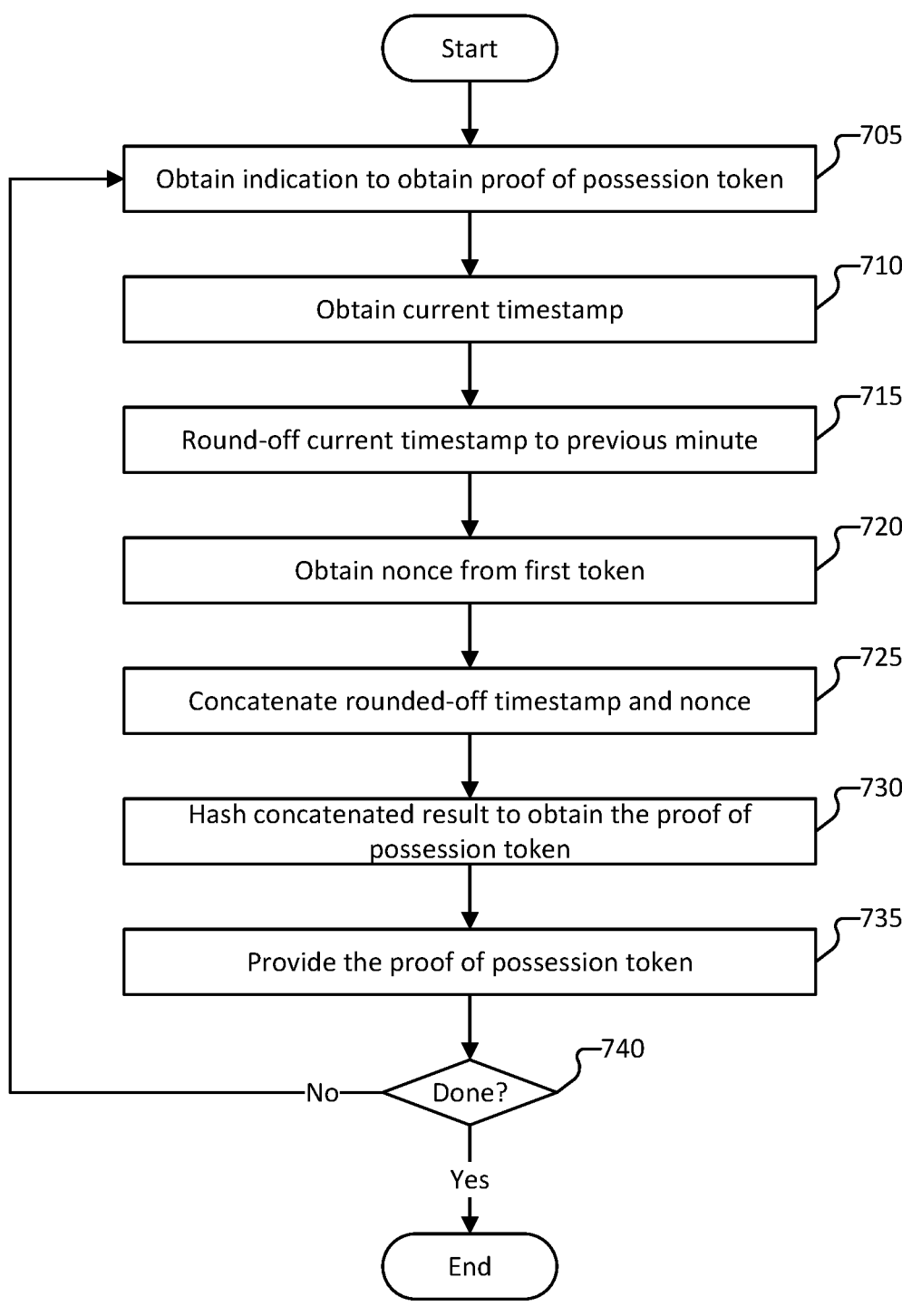
FIG. 7 is a flow diagram of a method for obtaining a proof of possession according to various embodiments.

FIG. 7 is a flow diagram of a method for obtaining a proof of possession according to various embodiments. In various embodiments, process 700 is implemented at least in part by system 100 of FIG. 1 and/or system 200 of FIG. 2. Process 700 may be implemented by an agent (e.g., a client agent that interfaces with the security profile) to generate a proof of possession token.

In some implementations, process 700 may be implemented by one or more servers, such as in connection with providing a service to a network (e.g., a security entity and/or a network endpoint such as a client device). In some implementations, process 700 may be implemented by a security entity (e.g., a firewall) such as in connection with enforcing a security policy with respect to files communicated across a network or in/out of the network.

Process 700 may be implemented in connection with processing an intercepted connection request for transmission to an explicit proxy for the corresponding web service. For example, the token can be communicated to a proxy for a service in connection with a connection request, which can use the token to validate the connection request to a service, such as to prevent/mitigate replay attacks.

At 705, the system obtains an indication to obtain a proof of possession token. The system may obtain the indication to obtain the proof of possession token from the service that invoked process 700. In some embodiments, the system may obtain the indication to obtain the proof of possession token from the service that is configured to update an intercepted connection request to insert the proof of possession token and the first token (e.g., a JWT) before forwarding to an explicit proxy.

At 710, the system obtains a current timestamp.

At 715, the system rounds-off the current timestamp to the previous minute. For example, if the time is 1:58, the system process rounds the current timestamp to 1:00.

At 720, the system obtains a nonce from the first token. As an example, the system extracts the nonce from the context of the first token (e.g., a JWT). The nonce may be obtained from a context structure comprised in the first token. In response to extracting the context structure, the system decrypts the context structure. The system decrypts the encrypted context structure based on a predefined decryption technique/algorithm. Examples of the decryption algorithm include a base64 decoding, a base64url decoding, etc. The context structure may be decrypted based on a key shared between a security portal and an explicit proxy cloud service. Various other decryption algorithms may be implemented. In response to decrypting the context structure, the system obtains the nonce.

At 725, the system concatenates the rounded-off timestamp and nonce to obtain a concatenated result. The system concatenates the rounded-off timestamp and the nonce according to a predefined concatenation process or protocol.

At 730, the system hashes the concatenated result to obtain the proof of possession token. In some embodiments, the system hashes the concatenated result based on a predefined hashing technique/algorithm. Examples of the encryption algorithm include SHA-256 hash, etc. Other hashing techniques may be implemented.

At 735, the system provides the proof of possession token. The system can provide the proof of possession token to the system or service that invoked process 700. For example, the system provides the proof of possession token to a service for the agent in connection with the updating of the connection request to include the proof of possession (e.g., to insert the proof of possession into a header for the connection request).

At 740, a determination is made as to whether process 700 is complete. In some embodiments, process 700 is determined to be complete in response to a determination that no further connection requests are to be processed, no further proof of possession tokens are to be obtained, an administrator indicates that process 700 is to be paused or stopped, etc. In response to a determination that process 700 is complete, process 700 ends. In response to a determination that process 700 is not complete, process 700 returns to 705.

FIG. 8 is a flow diagram of a method for providing a token according to various embodiments. In various embodiments, process 800 is implemented at least in part by system 100 of FIG. 1 and/or system 200 of FIG. 2. Process 800 may be implemented by a security portal to generate a token (e.g., a first token, which may be a JWT).

In some implementations, process 800 may be implemented by one or more servers, such as in connection with providing a service to a network (e.g., a security entity and/or a network endpoint such as a client device). In some implementations, process 800 may be implemented by a security entity (e.g., a firewall) such as in connection with enforcing a security policy with respect to files communicated across a network or in/out of the network.

Process 800 may be implemented in connection with providing a token to be used to connect to a service. For example, the token can be communicated to a proxy for a service in connection with a connection request, which can use the token to validate the connection request to a service, such as to prevent/mitigate replay attacks.

At 805, the system obtains a request for a token. In some embodiments, the system obtains the request for the token from an agent, such as an agent that intercepted the connection request before being communicated to a proxy for a particular service.

At 810, the system obtain user credentials associated with the request. In some embodiments, the system obtains the username associated with the request (e.g., the username or other identifier comprised in the request). The user credentials associated with the request for the token may correspond to the user credentials associated with the connection request for which the token is being obtained.

At 815, the system obtains a host identifier (e.g., HostID) associated with the request. For example, the system obtains device information associated with a connection request. The host identifier or other device information associated with the request for the token may correspond to the host identifier or other device information associated with the connection request for which the token is being obtained.

At 820, the system obtains a nonce for the token. In some embodiments, the system obtains the nonce based at least in part on a predefined process/algorithm. The nonce may be a random value or string. For example, the system generates a crypto secure random number according to a predefined algorithm. The system can generate a new (e.g., unique) nonce for each requested token.

At 825, the system determines an expiry timestamp for the token. In some embodiments, the system determines the expiry timestamp based at least in part on a current timestamp and a predefined expiry period. For example, the expiry timestamp is determined to be the time that is the predefined expiry period after the current timestamp. In some embodiments, the predefined expiry period is 1 minutes. Various other predefined expiry periods may be defined, such as 30 seconds, 2 minutes, etc.

At 830, the system generates a context structure based at least in part on the user credentials, the HostID, the nonce, and the expiry timestamp.

At 835, the system encrypts the context structure. In some embodiments, the system encrypts the context structure based at least in part on a predefined encryption technique/algorithm. Examples of the predefined encryption technique includes: a base64 encoding, a base64url encoding, etc.

At 840, the system attaches the (encrypted) context structure to a JSON web token (JWT). In some embodiments, the system inserts the context structure in the context of the JWT.

At 845, the system provides the token. For example, the system returns the token in response to the request for the token. The security portal may return the token (e.g., the first token) to an agent, which is configured to use the token to update an intercepted connection request before communicating the updated connection request for a proxy associated with a particular service (e.g., an explicit proxy).

At 850, a determination is made as to whether process 800 is complete. In some embodiments, process 800 is determined to be complete in response to a determination that no further connection requests are to be processed, no further tokens (e.g., no further first tokens, such as JWTs) are to be obtained, an administrator indicates that process 800 is to be paused or stopped, etc. In response to a determination that process 800 is complete, process 800 ends. In response to a determination that process 800 is not complete, process 800 returns to 805.

Figure 9:
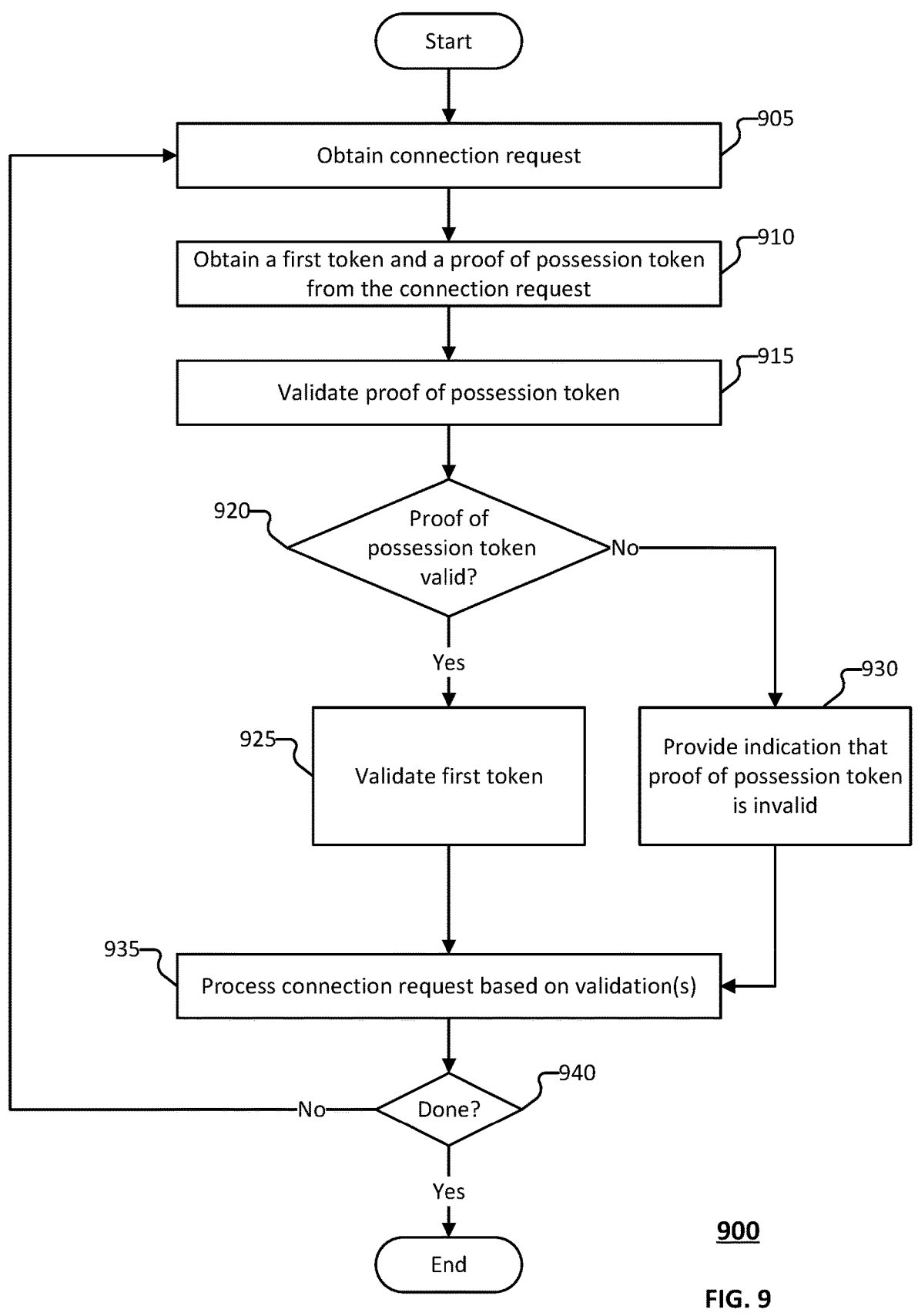
FIG. 9 is a flow diagram of a method for validating a connection request according to various embodiments.

FIG. 9 is a flow diagram of a method for validating a connection request according to various embodiments. In various embodiments, process 900 is implemented at least in part by system 100 of FIG. 1 and/or system 200 of FIG. 2. Process 900 may be implemented by explicit proxy 315.

In some implementations, process 900 may be implemented by one or more servers, such as in connection with providing a service to a network (e.g., a security entity and/or a network endpoint such as a client device). In some implementations, process 900 may be implemented by a security entity (e.g., a firewall) such as in connection with enforcing a security policy with respect to files communicated across a network or in/out of the network.

According to various embodiments, processing the proof of possession (POP) token comprises: (i) verifying whether the system stores a matching cached POP within a predefined window (e.g., a two-minute window), (ii) verify whether a stored POP matches a token (e.g., generated at, or separately obtained by, explicit proxy 315) that is generated using the current minute timestamp, and (iii) verify whether a stored POP matches a token (e.g., generated at, or separately obtained by, explicit proxy 315) using a previous-minute timestamp.

Process 900 may be implemented in connection with providing access to a service. For example, an explicit proxy implements process 900 to validate a connection request to a service, such as to prevent/mitigate replay attacks.

At 905, the system obtains a connection request. The system may obtain the request from an agent that has intercepted the connection request and updated the connection request to include credentials to access the service being requested.

At 910, the system obtains a first token and a proof of possession token from the connection request. In some embodiments, the system obtains the first token and the proof of possession from the header of the connection request (e.g., a connection request to which the agent has inserted the proof of possession token and the first token into the header). The first token may be a JWT.

At 915, the system validates the proof of possession token. In some embodiments, validating the proof of possession token comprises invoking process 1000 of FIG. 10. For example, the system determines whether the proof of possession token extracted from the connection request matches a value computed by the system (e.g., the explicit proxy).

At 920, the system determines whether the proof of possession token is valid. In response to determining that the proof of possession token is valid at 920, process 900 proceeds to 925. Conversely, in response to determining that the proof of possession toke is not valid at 920, process 900 proceeds to 930.

At 925, the system validates the first token. In some embodiments, the system validates the first token based at least in part on determining whether the first token is still valid. For example, the system extracts an expiry timestamp from the first token and determines, based on the expiry timestamp, whether the first token has expired. If the system determines that the current time is within a predefined time period from the expiry timestamp, the system (e.g., the explicit proxy) may provide an indication to renew the first token (e.g., the JWT). For example, the explicit proxy provides an indication to the agent that the agent is to obtain a new token (e.g., from the portal).

At 930, the system provides an indication that the proof of possession token is invalid. For example, in response to determining that the proof of possession token is invalid, the system rejects the connection request and provides a 407 response code. The system may reject the connection request by not further processing the connection request or by refusing service in for the connection request.

At 940, a determination is made as to whether process 900 is complete. In some embodiments, process 900 is determined to be complete in response to a determination that no further connection requests are to be processed, an administrator indicates that process 900 is to be paused or stopped, etc. In response to a determination that process 900 is complete, process 900 ends. In response to a determination that process 900 is not complete, process 900 returns to 905.

Figure 10:
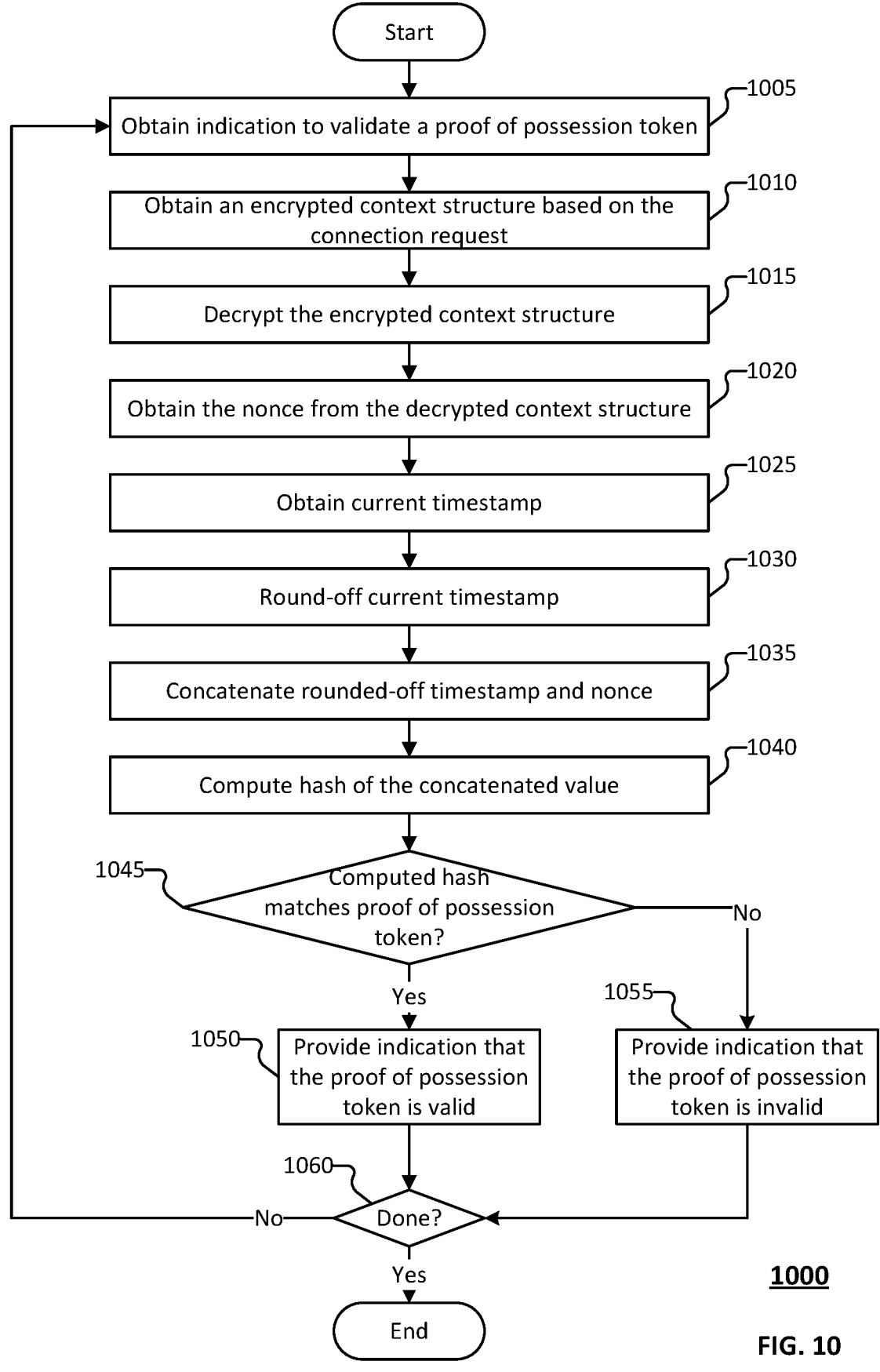
FIG. 10 is a flow diagram of a method for validating a proof of possession token according to various embodiments.

FIG. 10 is a flow diagram of a method for validating a proof of possession token according to various embodiments. In various embodiments, process 1000 is implemented at least in part by system 100 of FIG. 1 and/or system 200 of FIG. 2. Process 1000 may be implemented by explicit proxy 315. In some embodiments process 1000 is invoked by 915 of process 900.

In some implementations, process 1000 may be implemented by one or more servers, such as in connection with providing a service to a network (e.g., a security entity and/or a network endpoint such as a client device). In some implementations, process 1000 may be implemented by a security entity (e.g., a firewall) such as in connection with enforcing a security policy with respect to files communicated across a network or in/out of the network.

Process 1000 may be implemented in connection with providing access to a service. For example, an explicit proxy implements process 1000 to validate a connection request to a service, such as to prevent/mitigate replay attacks.

At 1005, the system obtains an indication to validate a proof of possession token. The system may obtain the indication to validate the proof of possession token in connection with processing a connection request, such as to process the connection request in a manner to restrict replay attacks.

At 1010, the system obtains an encrypted context structure based at least in part on the connection request. The system can obtain the encrypted context structure based on the header of the connection request. For example, the system obtains the first token (e.g., a JWT, etc.) comprised in the header of the connection request (e.g., a header that is updated by the agent). In some embodiments, the system obtains the encrypted context structure based on the context of the JWT.

At 1015, the system decrypts the encrypted context structure. The system decrypts the encrypted context structure based on a predefined decryption technique/algorithm. Examples of the decryption algorithm include a base64 decoding, a base64url decoding, etc. Various other decryption algorithms may be implemented.

At 1020, the system obtains the nonce from the decrypted context structure.

At 1025, the system obtains a current timestamp.

At 1030, the system rounds-off the current timestamp. In some embodiments, the system rounds-off the current timestamp to the previous minute. For example, if the time is 1:58, the system process rounds the current timestamp to 1:00.

At 1035, the system concatenates the rounded-off timestamp and nonce. As an example, the system concatenates the rounded-off time stamp and nonce according to a predefined process or algorithm.

At 1040, the system computes a hash of the concatenated value. In some embodiments, the system computes the hash based on a predefined hashing algorithm. As an example, the system determines a SHA-256 hash of the concatenated value.

At 1045, the system determines whether the computed hash matches a proof of possession token. As an example, the system determines whether the computed hash is the same as, or equal to, the proof of possession token.

In response to determining that the computed hash matches the proof of possession token, process 1000 proceeds to 1050 at which the system provides an indication that the proof of possession token is valid. In contrast, in response to determining that the computed hash does not match the proof of possession token, process 1000 proceeds to 1055 at which the system provides an indication that the proof of possession token is invalid.

In some embodiments, if the system determines that the computed hash does not match the proof of possession token, the system can repeat 1030-1045 based on a rounding off the timestamp to the previous minute and then decrease the timestamp by another minutes. For example, if the current timestamp is 2:30, the system rounds-off the timestamp to 2:00, and then determines the previous rounded-off timestamp as 1:00. The system may determine the timestamp according to this iteration to handle edge cases where the proof of possession token is generated at a time of 1:59 (e.g., where the timestamp is rounded-off to 1:00) and process 1000 is being implemented at 2:01 (e.g., where the timestamp would be rounded off to 2:00, which would lead to a computed hash being generated based on the rounded-off timestamp 2:00 to not match the proof of possession token).

At 1060, a determination is made as to whether process 1000 is complete. In some embodiments, process 1000 is determined to be complete in response to a determination that no further proof of possession tokens are to be validated, no further connection requests are to be processed, an administrator indicates that process 1000 is to be paused or stopped, etc. In response to a determination that process 1000 is complete, process 1000 ends. In response to a determination that process 1000 is not complete, process 1000 returns to 1005.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for authenticating traffic, comprising:
   one or more processors;
   a memory coupled to the one or more processors and configured to provide the one or more processors with instructions when executed cause the processor to:
      generate a request for a first token for a user based at least in part on providing to a security portal user credentials to authenticate the user;
      obtain a context structure comprising user information, a nonce, and a timestamp;
      intercept a connection request on a local proxy listener; and
      generate an updated connection request based at least in part on adding the first token and a proof of possession token to the connection request, wherein the proof of possession token is validated by a cloud service based at least in part on information comprised in the first token; and
   an agent service running on a security entity, wherein the agent service intercepts the connection request, generates the updated connection request, and sends the updated connection to an explicit proxy; wherein the explicit proxy validates the proof of possession token comprised in the updated connection request based at least in part on:
      decrypting the context structure to obtain a decrypted context structure;
      obtain the nonce from the decrypted context structure;
      obtain a current timestamp;
      round the current timestamp off to a previous minute;
      concatenate the rounded current timestamp with the nonce obtained from the decrypted context structure to concatenated value;
      generate a hash of the concatenated value; and
      compare the hash to the proof of possession token comprised in the updated connection request.

2. The system of claim 1, wherein updated connection request comprises a request to access a set of common enterprise web applications use one or more of HyperText Markup Language (HTML), an HTML5, and JavaScript.

3. The system of claim 1, wherein in response to determining that the hash matches the proof of possession token, the explicit proxy deems the user to be authenticated.

4. The system of claim 1, wherein the explicit proxy provide an indication to generate a new first token to the agent if a current time is within a predetermined period of time of token expiration for the first token.

5. The system of claim 1, wherein the agent service obtains the context structure from the security portal configured to provide secure remote access to a set of common enterprise web applications.

6. The system of claim 5, wherein the security portal provides the context structure to the agent in response to authenticating credentials for the user.

7. The system of claim 1, wherein the security entity comprises a firewall.

8. The system of claim 1, wherein the updated connection request is communicated to the explicit proxy in connection with an accessing of a web service.

9. The system of claim 1, wherein the first token is a JavaScript Object Notation JSON web token (JWT).

10. The system of claim 9, wherein the first token is safeguarded against replay attacks.

11. The system of claim 1, wherein the first token is an authentication cookie that is safeguarded against replay attacks.

12. The system of claim 1, wherein the user information comprises one or more of a user identifier and a host identifier.

13. The system of claim 1, wherein the nonce comprises a password for the first token.

14. The system of claim 13, wherein the password is a crypto secure random number.

15. The system of claim 1, wherein the timestamp is used in connection with determining an expiry time for the first token.

16. The system of claim 15, wherein the first token is valid for one minute after the timestamp.

17. The system of claim 15, wherein the timestamp corresponds to a time at which the first token is generated rounded off to a previous minute.

18. The system of claim 1, wherein generating the updated connection request comprises adding the first token and the proof of possession token to a header of the connection request.

19. The system of claim 1, wherein the one or more processors are further configured to:

generate a request for a new first token based at least in part on providing to the security portal user credentials to authenticate the user; and obtain from the security portal a valid first token.

20. The system of claim 19, wherein the valid first token is used to generate updated connection requests for a set of connection requests intercepted after the valid first token is obtained and before the valid first token expires.

21. The system of claim 1, wherein the proof of possession token is created based at least in part on:

obtaining a current timestamp;

rounding the current timestamp to a previous minute;

concatenate the current timestamp with the nonce to obtain a concatenated value; and generate a hash of the concatenated value to obtain the proof of possession token.

22. A method for authenticating traffic, comprising:

generating, by one or more processors, a request for a first token for a user based at least in part on providing to a security portal user credentials to authenticate the user;

obtaining a context structure comprising user information, a nonce, and a timestamp;

intercepting, by an agent service running on a security entity, a connection request on a local proxy listener;

generating, by the agent service, an updated authentication token based at least in part on adding the first token and a proof of possession token to the connection request, wherein the proof of possession token is validated by a cloud service based at least in part on information comprised in the first token; and sending, by the agent service, the updated connection to an explicit proxy; wherein the explicit proxy validates the proof of possession token comprised in the updated connection request based at least in part on:

decrypting the context structure to obtain a decrypted context structure;

obtain the nonce from the decrypted context structure;

obtain a current timestamp;

round the current timestamp off to a previous minute;

concatenate the rounded current timestamp with the nonce obtained from the decrypted context structure to concatenated value;

generate a hash of the concatenated value; and compare the hash to the proof of possession token comprised in the updated connection request.

23. A computer program product embodied in a non-transitory computer readable medium for authenticating traffic, and the computer program product comprising computer instructions for:

generating, by one or more processors, a request for a first token for a user based at least in part on providing to a security portal user credentials to authenticate the user;

obtaining, by one or more processors, a context structure comprising user information, a nonce, and a timestamp;

intercepting, by an agent service running on a security entity, a connection request on a local proxy listener;

generating, by the agent service, an updated authentication token based at least in part on adding the first token and a proof of possession token to the connection request, wherein the proof of possession token is validated by a cloud service based at least in part on information comprised in the first token; and sending, by the agent service, the updated connection to an explicit proxy; wherein the explicit proxy validates the proof of possession token comprised in the updated connection request based at least in part on:

decrypting the context structure to obtain a decrypted context structure;

obtain the nonce from the decrypted context structure;

obtain a current timestamp;

round the current timestamp off to a previous minute;

concatenate the rounded current timestamp with the nonce obtained from the decrypted context structure to concatenated value;

generate a hash of the concatenated value; and compare the hash to the proof of possession token comprised in the updated connection request.

\* \* \* \* \*